Sept. 1, 1964  G. STEINMEYER  3,146,521
DEVICE FOR LINING TAPPED HOLES
Filed Feb. 12, 1962  2 Sheets-Sheet 1
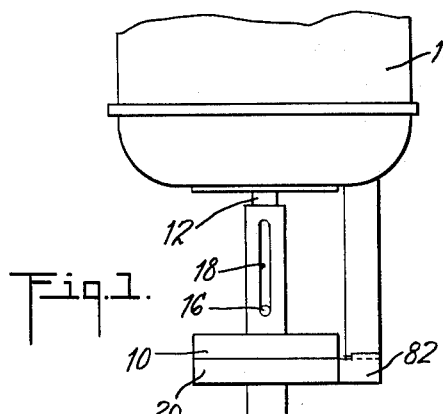
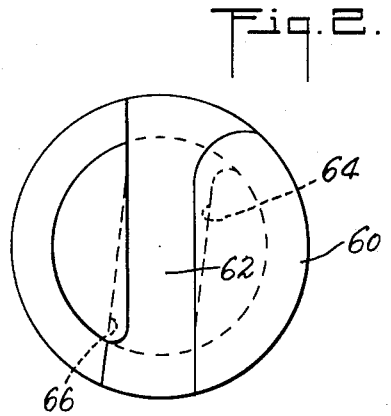
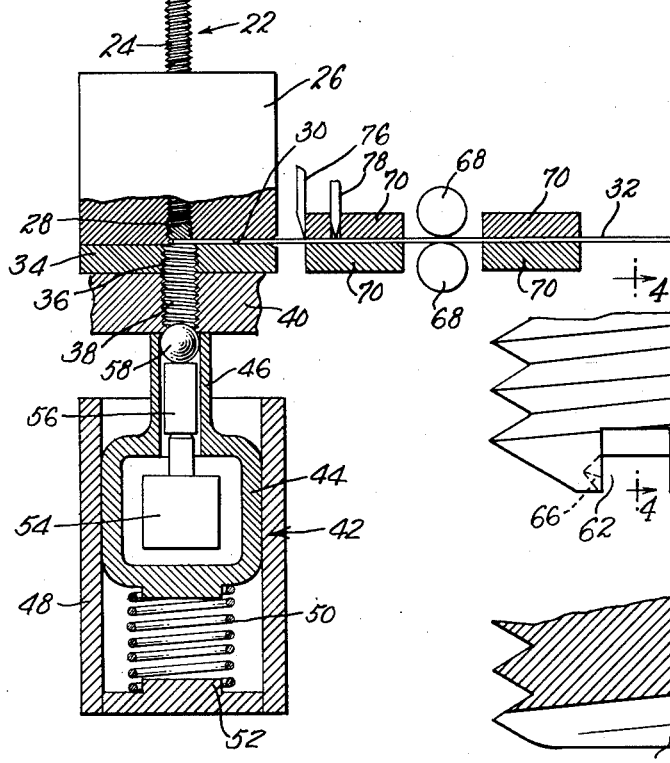
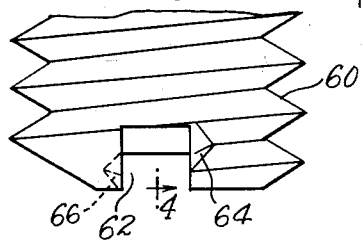
INVENTOR.
GERHARD STEINMEYER
BY Walter S. Olerton
ATTORNEY

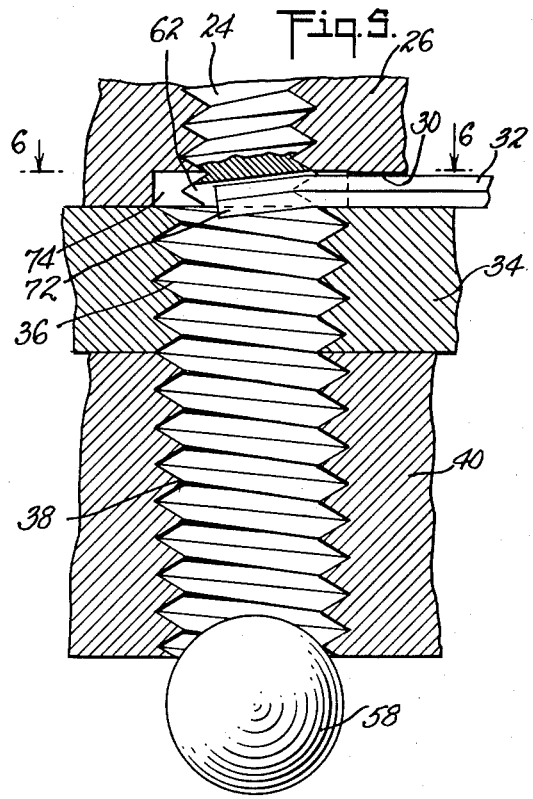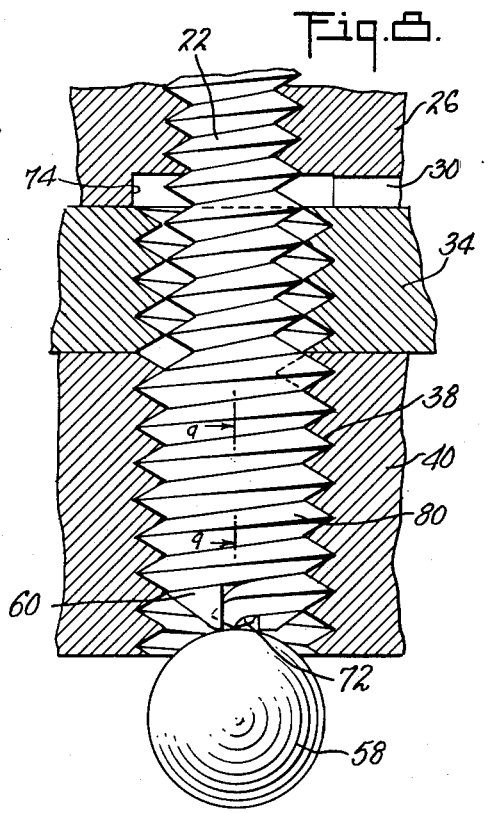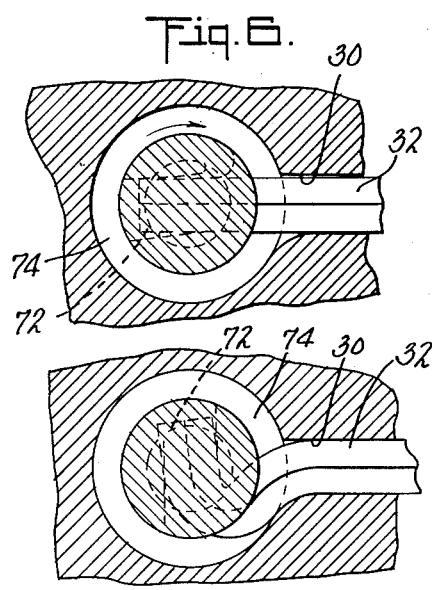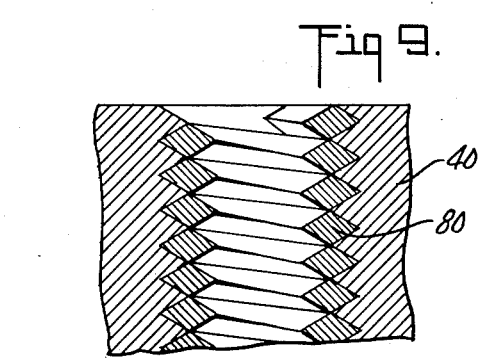

3,146,521
DEVICE FOR LINING TAPPED HOLES
Gerhard Steinmeyer, Heepen, near Bielefeld, Germany, assignor to Heli-Coil Corporation, Danbury, Conn., a corporation of Delaware
Filed Feb. 12, 1962, Ser. No. 172,579
5 Claims. (Cl. 29—240.5)

The invention relates to a device for the lining of tapped holes, for instance, in light metal, plastics, wood or the like, with a resistant wire, such as steel wire, wire of artificial material or the like.

Such a conventional lining renders to the screw threads a high resistance against wear and permits a repeated screwing-in and out of the screw bolts.

It is common practice to produce preliminarily so-called wire coils or screw thread inserts on special machines and to introduce them, in a further step of operation, with the aid of another tool, into the tapped hole or the like to be lined. Such a method of operation and production is time consuming and costly considering the required machines, working time and labor costs and is, therefore, disadvantageous.

It is an object of the invention to eliminate these drawbacks and to provide a method and a device which renders it possible to line a tapped hole directly with a conventional wire, such as steel wire or the like without separately manufacturing a wire coil as an independent intermediate product.

A device according to the invention for lining tapped holes may comprise, subsequent to a feeding device for the wire, a rotatable and angularly thereto, shiftable mandrel with a lower inserting groove for the wire end wherein the mandrel in its protracted position can engage into the tapped hole of the job to be lined.

For this purpose, the mandrel may be suitably guided in a stationary guide block with a corresponding screw thread. This guide block may be provided with a guide groove or a guide channel through which the wire will be supplied to the mandrel from the outside.

The device may further comprise means for clamping and releasably connecting the workpiece provided with a tapped hole to be lined to a guide block in such a manner that after being centered the mandrel head with the lining wire bent into it enters into the hole to be lined. As centering device, a spring-supported ball or a cone may be provided which, carried by the clamping device, engages into the tapped hole of the workpiece and secures it centrally.

Suitably arranged limit switches may be provided for controlling the movement of the mandrel.

Further objects and details of the invention will be apparent from the description given hereinafter and the accompanying drawing illustrating an embodiment thereof by way of example.

In the drawing:

FIG. 1 is a diagrammatic side elevation of the device partly in section,

FIG. 2 is a front view of the mandrel head with its slot on a larger scale,

FIG. 3 is a side elevation of the mandrel head,

FIG. 4 is a section along line 4—4 of FIG. 3,

FIG. 5 is a vertical section of the central portion of the device of FIG. 1, with the mandrel in the wire-receiving position, FIG. 6 is a section along line 6—6 of FIG. 5, FIG. 7 is a section similar to FIG. 6 with the mandrel turned 90°, FIG. 8 is a section similar to FIG. 5 with the mandrel head in its protracted position with the coiled wire thereon, and FIG. 9 is a cross-section of the workpiece with the finished wire coil therein.

Referring now to the drawings, the upper half 10 of a friction clutch is lengthwise shiftable on the shaft 12 of a reversible motor 14. The connection between clutch part 10 and shaft 12 is established by a pin 16 secured to the shaft and engaging in an elongated slot 18 of part 10. The lower clutch part 20 is secured to the upper or foot end of a mandrel 22 which is provided with a screw thread 24 substantially throughout its length. The mandrel 22 screws through a stationary guide block 26 which has an inner screw thread 28 complementing that of the mandrel.

In the lower side of the stationary block 26 a groove 30 is worked which has a cross-section according to that of the wire 32 to be used for lining the tapped hole of a workpiece. A cover and guiding plate 34 is secured, by means not shown, to the lower face of the block 26 so as to cover the groove 30. Plate 34 is provided with a tapped hole 36 coaxial with the thread 28 of the block 26. The thread of the hole 36 is complementary to the outer thread formed by the wire 32 when coiled, i.e. it is substantially of the same dimensions as the tapped thread 38 of the workpiece 40 which is urged from below against the plate 34 so that the tapped hole 38 is coaxial with the threads 28 and 36. For this purpose, a clamping device 42 is provided comprising a housing 44 with a hollow neck 46. The housing 42 is slidable in a stationary well 48 and a compression spring 50 is located between the well bottom 52 and the housing 44. The arrangement is such that the neck 46 presses the workpiece 40 from below against the plate 34. Within the housing 44 a limit switch 54 including a switching pin 56 is so arranged that the latter extends into the housing neck 46 biased by a spring (not shown). A ball 58 bears on the switching pin 56. The ball serves as an abutment for the downwardly moving head 60 of the mandrel 22, as clearly shown in FIG. 8. When the mandrel advances, the ball 58 and with it the switching pin 56 will be pressed downward in order to reverse the motor 14 and thus to move the mandrel in the opposite direction owing to electrical connections (not shown) between the switch 54 and the motor 14. The ball 58, furthermore, engages into the tapped hole 38 of the workpiece 40 to be lined, thereby aligning the hole 38 exactly in the direction of the advancing mandrel in order to center it. Obviously, a cone (not shown) may be substituted for the ball 58.

The formation of the front end or head 60 of the mandrel will be apparent from FIGS. 2 to 4. The end face is provided with a diametrical slot 62 undercut at 64 and 66 so that the wire entering the slot from the end at 66 will clamp tight when the spindle rotates and will be pulled into the following thread groove convolutions.

The device operates in the following manner:

The wire having, for instance, a diamond-shaped or pear-shaped cross-section and coming from the rolling mill, extruding or injection molding installation or from a big reel on which the wire stock is wound, will be advanced by the preferably driven rollers 68 and thereby runs through the guide pieces 70 into the groove 30 so far that the front end 72 of the wire, as clearly shown in FIGS. 1 and 5, engages in the slot 62 of the mandrel, the wire end 72 suitably not extending quite through the entire length of the slot 62. For this purpose, the slot 62 must be located in the prolongation of the guide groove 30 and the mandrel head end must be flush with the guide groove 30 when the mandrel is in its raised position.

When the mandrel rotates it takes along the front wire end so that the wire bends exactly into the thread groove convolutions 24 of the mandrel 22 during the advancement of the spindle in the direction towards the ball 58. In order to allow for the bending of the wire, a circular recess 74 is provided in the block 26 substantially in a plane including the groove 30, as it is best seen in FIGS. 6 and 7. While the wire is being so bent or even prior thereto the wire 32 will have been cut to the suitable length by a severing device 76. Guided by the guide block 26, the head of the mandrel 22 runs through the cover plate 34 the thread of which is so largely dimensioned in its cross-section that there is no intermediate space between the mandrel with the wire lying in its thread groove and the convolutions of the thread 36 of the plate 34. Subsequently thereto the mandrel 22 enters into the tapped hole 38 of the workpiece 40 in such a manner that the bent-in wire engages into the tapped convolutions to be lined therewith. When the head 60 of the mandrel abuts against the centering ball 58, as shown in FIG. 8, and urges the ball downwards, the motor 14 will be reversed by means of the limit switch 54, for instance from clockwise to anti-clockwise rotation. Thereby mandrel 22 runs backward while the wire piece 80 stays tightly seated in the tapped hole 38 to be lined. In detail, upon the change of the direction of rotation of the mandrel the lower wire end will wedge in the workpiece whereas the front part of the wire end will be screwed out of the groove 62 of the mandrel head 60.

Thereupon the mandrel 22 returns in anti-clockwise movement into its original position and will automatically switch off the motor 14, for instance by a cam 82 at the lower clutch half 20. In this upper end position of the mandrel, the slot 62 extends in exactly the same direction as the guiding groove 30.

By switching-in the driving rollers 68, a new piece of wire 32 will be fed and cut to proper length. A new screwing operation can start.

In order to equalize differences of the thread exit and entrance which may occur between the guide block 26 and the workpiece 40, the housing 44 is movably supported by means of spring 50.

It is within the scope of the invention to control the advancement of the mandrel in another manner also, e.g. by spring force. Similarly, the switching of the mandrel and of the wire feed can be carried through with differently arranged switches.

The described method and a suitable device excel by a simple mode of operation. Without much readjustment, differently shaped wire profiles may be employed for differently tapped holes by using the same basic tool. The method is also superior due to its great speed of operation.

In order to remove the front end of the wire which has been bent out of the slot of the mandrel and possibly projects into the interior of the tapped hole to be lined, it can be advantageous to provide a notch prior to the bending of the wire into the thread groove convolutions of the mandrel, i.e. during the feeding of the wire. For this purpose, a notching device 78 may be arranged in front of the severing device 76. On account of the provided notch, the protruding wire end may be readily knocked off.

It will be apparent to those skilled in the art that many modifications and alterations of the structure illustrated and described hereinbefore can be made without departure from the spirit and essence of the invention which for that reason shall not be limited but by the scope of the appended claims.

I claim:
1. A device for coiling a screw-thread insert of a profiled wire and lining therewith the tapped hole of a workpiece of a light metal, plastic, wood or the like in one continuous operation, comprising
   a helically movable, screw threaded mandrel provided with a slot in its head end;
   means to move the mandrel from a retracted to a protracted position and back again;
   an interiorly threaded guiding member, the screw thread of said guiding member including a rearward portion permanently engaged by said mandrel and a forward portion mating the outer thread formed by said insert to be coiled, said member being provided between said portions with a passage through which said wire can enter the slot of the mandrel in the retracted position in order to be coiled into the thread groove of the mandrel and into the second portion of the thread of the guiding member when the mandrel is being projected;
   and supporting means for said workpiece, said means including an element having a supporting surface, said workpiece being receivable between said supporting surface and said guiding member, a spring engaging said element so as to urge said workpiece on said element resiliently against said guiding member, and means engaging said workpiece and ensuring coaxiality of the holes of said workpiece and said guiding member.

2. A device as in claim 1, said guiding member comprising two adjoining parts, the first part being provided with said rearward screw thread portion, the second part being provided with said forward screw thread portion, and said passage being a groove extending into an annular recess coaxial with the mandrel and of an outer circumference at least as large as the outer circumference of the insert to be coiled, said groove and said recess being provided in one of the said parts where it adjoins the other one.

3. A device as in claim 1, said supporting means further comprising a stationary well member open at its end facing said guiding member, said element being guided in said well coaxially with said mandrel and including a hollow neck adapted to bear against said workpiece in a zone surrounding the hole of the latter, and said spring being located between said element and the bottom of said well.

4. A device as in claim 3 for a workpiece with a through-going tapped hole, said coaxiality-ensuring means comprising a centering member guided within said element and adapted to engage the forward inner rim of the hole of said workpiece and to yield when engaged by the advancing mandrel.

5. A device as in claim 4 wherein said centering member is a ball or cone and said element includes a hollow body, further comprising a limit switch inside said element for reversing said mandrel, said limit switch being arranged between said centering member and the bottom of said hollow body so as to be operative when the advancing mandrel shifts said centering member towards said limit switch.

References Cited in the file of this patent
UNITED STATES PATENTS

| | | |
|---|---|---|
| 1,073,090 | Burck | Sept. 16, 1913 |
| 2,371,674 | Caminez | Mar. 20, 1945 |
| 2,390,524 | Eckener | Dec. 11, 1945 |
| 2,424,974 | Erb | Aug. 5, 1947 |